(12) United States Patent
Yan et al.

(10) Patent No.: US 9,661,404 B2
(45) Date of Patent: May 23, 2017

(54) OPTICAL LINE TERMINAL DEVICE AND IMPLEMENTATION METHOD THEREOF

(75) Inventors: Lei Yan, Shenzhen (CN); Rongqin Yan, Shenzhen (CN); Zhenli Yang, Shenzhen (CN); Mingshi Sun, Shenzhen (CN); Wei Huang, Shenzhen (CN); Yongfeng Zhou, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 264 days.

(21) Appl. No.: 14/395,366

(22) PCT Filed: Jul. 6, 2012

(86) PCT No.: PCT/CN2012/078261
§ 371 (c)(1),
(2), (4) Date: Oct. 17, 2014

(87) PCT Pub. No.: WO2013/155794
PCT Pub. Date: Oct. 24, 2013

(65) Prior Publication Data
US 2015/0078747 A1    Mar. 19, 2015

(30) Foreign Application Priority Data

Apr. 20, 2012 (CN) .......................... 2012 1 0119662

(51) Int. Cl.
*H04Q 11/00* (2006.01)
*H04L 12/28* (2006.01)

(52) U.S. Cl.
CPC ..... *H04Q 11/0003* (2013.01); *H04L 12/2861* (2013.01); *H04L 12/2885* (2013.01); *H04Q 11/0005* (2013.01); *H04Q 11/0067* (2013.01)

(58) Field of Classification Search
CPC ....... H04Q 11/0005; H04Q 2011/0039; H04Q 11/0062; H04Q 2011/0052;
(Continued)

(56) References Cited

U.S. PATENT DOCUMENTS

| | | | |
|---|---|---|---|
| 2004/0264961 A1* | 12/2004 | Nam | H04Q 11/0067 398/58 |
| 2008/0037535 A1 | 2/2008 | Yoon et al. | |
| 2009/0324228 A1* | 12/2009 | Bernard | H04J 3/0682 398/79 |

FOREIGN PATENT DOCUMENTS

| | | |
|---|---|---|
| CN | 101056474 A | 10/2007 |
| CN | 101217826 A | 7/2008 |

(Continued)

OTHER PUBLICATIONS

International Search Report (in Chinese with English Translation) for PCT/CN2012/078261, mailed Jan. 24, 2013; ISA/CN.

*Primary Examiner* — Ted Wang
(74) *Attorney, Agent, or Firm* — Harness, Dickey & Pierce, P.L.C.

(57) ABSTRACT

An optical line terminal (OLT) device and an implementation method thereof, relate to the field of a passive optical network (PON). The OLT device includes an interface unit for receiving data in an Ethernet format sent by a service processing apparatus, performing protocol processing on the received data in the Ethernet format, converting the data after the protocol processing into a transmission signal corresponding to a sending interface, and then transmitting the transmission signal to an external device, as well as receiving message data sent by the external device, converting the message data for protocol processing corresponding to the service processing apparatus, converting the signal after the protocol processing into data in the Ethernet format, and transmitting the data to the service processing apparatus; the service processing apparatus performing service processing on the data transmitted by the interface unit, and transmitting the processed data to the interface unit.

11 Claims, 3 Drawing Sheets

(58) Field of Classification Search
CPC ....... H04Q 2011/0015; H04Q 11/0003; H04Q 11/0067; H04L 12/2861; H04L 12/2885
See application file for complete search history.

(56) References Cited

FOREIGN PATENT DOCUMENTS

| | | |
|---|---|---|
| CN | 102149025 A | 8/2011 |
| EP | 2403191 A1 | 1/2012 |
| JP | 2004282749 A | 10/2004 |
| KR | 20040056477 A | 7/2004 |

* cited by examiner

OPTICAL LINE TERMINAL DEVICE AND IMPLEMENTATION METHOD THEREOF

CROSS REFERENCE TO RELATED APPLICATIONS

This application is a U.S. National Phase Application under 35 U.S.C. 371 of International Application No. PCT/CN2012/078261 filed on Jul. 6, 2012 and published in Chinese as WO 2013/155794 A1 on Oct. 24, 2013. This application is based on and claims the benefit of priority from Chinese Patent Application No. 201210119662.1 filed Apr. 20, 2012. The entire disclosures of all of the above applications are incorporated herein by reference.

TECHNICAL FIELD

The present document relates to the field of PON (Passive Optical Network), and more particularly, to an OLT (optical line terminal) device and implementation method thereof.

BACKGROUND OF THE INVENTION

A Passive Optical Network (PON) system is a pure media network, which avoids both the electromagnetic interference from external devices and the lightning effects, and reduces the failure rate of the lines and the external devices, it has features of high system reliability, saves fiber resources, has low maintenance costs, and is transparent to the network protocol, and it is a technology that is desired by the telecommunications maintenance department for a long time. Currently, a typical application networking of the passive optical network system is shown as in FIG. 1.

A Optical Line Terminal (OLT) device is a central office device in a passive optical network (PON) system, and it is a multi-service provisioning platform that supports both IP services and traditional TDM (Time Division Multiplexing) services. It is placed at the edge of a metropolitan area network or the exit of a community access network, respectively converges and sends access services to an IP network. It can connect with a plurality of ONUs (Optical Network Units) at the far end through an ODN (Optical Distribution Network), to implement the transmission of user data. It uses the PON port to connect with the PON port of the remote ONU through the ODN, so as to implement the information transmission and exchange between the OLT and the ONU, to communicate with the central office device with the 10/100/1000M electrical port (RJ45) or the 1000M optical port (SFP or GBIC), and to complete the information exchange between the OLT and the upper layer device. Currently, the structure of the OLT device system is shown in FIG. 2. It consists of a service board (i.e., a PON line card), a switch control board (i.e., a main control board), a backplane, an uplink board, a power supply and a fan. The uplink service is subjected to various PON protocol processing, message processing and traffic management through a passive optical network (PON) line card, and then is sent to the switch control board (main control board). The switch control board controls the communication between the line cards and controls the sending uplink port of each line card. The switch capacity of the switch control board decides the capacity and integration level of the conventional optical line terminal (OLT) device.

In order to prevent occurrence of the situation that three networks of data, telephone, television are installed in the household in the conventional residence network construction in a new access network, which results in duplication constructions and resource waste, and to simplify the network management, to reduce the maintenance costs and to adapt to more and more derivative and abundant value-added services, such as teletext, VOIP (Voice over Internet Protocol), video mail and online games, and to fully expand the range of services, whether having the capability of triple play is already a key point in deciding whether a new access technology has vitality or not. But the access network device, especially the optical line terminal (OLT) device, has a wide variety of derived single board types in the constant upgrading process, while the number of slots in a single device and the switching capacity are limited, resulting in the difficult in further enhancing the integration level of the device; moreover, different single boards cannot take full advantage of the slot bandwidth and the overall switching capacity, while the excessive bandwidth cannot be allocated to other interfaces, resulting in limitation to the access modes; especially, every upgrade and expansion of the network involves in the replacements of a large number of boards, and even the replacement of the whole device, so the upgrading preparation time is long, meanwhile the production cost and operation cost of the device are high.

SUMMARY OF THE INVENTION

The purpose of an embodiment of the present document is to provide an OLT (optical line terminal) device and implementation method thereof, in order to achieve triple play of the OLT device based on a passive optical network (PON).

The OLT device in accordance with an embodiment of the present document comprises an interface unit and a service processing apparatus, wherein:

the interface unit is configured to: receive data in an Ethernet format transmitted by the service processing apparatus, perform protocol processing on the received data in the Ethernet format, convert the data after protocol processing into a transmission signal corresponding to a sending interface and then transmit the transmission signal to an external device, as well as receive message data sent by the external device, and convert the message data for protocol processing corresponding to the service processing apparatus, and convert a signal after the protocol processing into data in the Ethernet format, and transmit the data to the service processing apparatus;

the service processing apparatus is configured to: perform service processing on the data transmitted by the interface unit, and transmit the processed data to the interface unit.

Preferably, in the abovementioned terminal device, the service processing apparatus is implemented with an Ethernet switch.

Preferably, in the abovementioned terminal device, the service processing apparatus comprises a core area, a backplane area, a power supply area, and a fan area, wherein:

the core area is configured to: perform service processing on the signal transmitted by the interface unit, and transmit the processed signal to the interface unit, as well as implement data transmission between various services through the backplane area.

Preferably, in the abovementioned terminal device, the core area comprises a pass-through daughter card, a low-speed switch daughter card and a high-speed switch daughter card, wherein:

the pass-through daughter card is configured to: communicate with each switch daughter card, and the switch daughter card comprises a low-speed switch daughter card and a high-speed switch daughter card;

the high-speed switch daughter card is configured to: perform a basic communication function between each switch daughter card, and process information carried in messages sent to an external device;

the low-speed switch daughter card is configured to: perform an encapsulation and conversion on the messages in the backplane area, and implement data exchange between each switch daughter cards.

Preferably, in the abovementioned terminal device, the high-speed switching daughter card comprises a public switch module, a public management module, a public clock module and a cascade communication module, wherein:

the public switch module is configured to: receive an Ethernet signal output by the interface unit, complete message modifying and forwarding operations of a switch part, and for messages that need to be reported to a network management system or processed by a CPU, forward the messages to the public management module through an Ethernet interface specified in the interface unit, while for messages that cannot be processed by a CPU because there is no local CPU or the local CPU is not able to process the messages, directly forward the messages to the public management module, and for ordinary service messages, forward the messages to the cascade communications module;

the public management module is configured to: perform local CPU processing on the received messages that need to be reported to a network management system or processed by a CPU, for messages that cannot be processed by a CPU because there is no local CPU or the local CPU is not able to process the messages, directly output the messages to the backplane area through an encapsulation by the local public management module, as well as receive a management information message from the backplane area;

the public clock module is configured to: process an input clock signal which has passed through the interface unit, support to configure and extract a channel associated clock signal of any two-way interface signals connected with the switch module, and support a direct communication to the backplane area;

the cascade communication module is configured to: process the received ordinary service messages, and determine the information to be carried in the message when being sent to an external device.

Preferably, in the abovementioned terminal device, the low-speed switch daughter card comprises a local switch module, a local management module, a local clock module and an inter-board communication module, wherein:

the local switch module is configured to: receive an Ethernet signal output from the interface unit, complete message modifying and forwarding operations of a switch part, for messages that need to be reported to a network management system or processed by a CPU, forward the messages to the local management module through an Ethernet interface specified in the interface unit, for messages that cannot be processed by a CPU because there is no local CPU or the local CPU is not able to process the messages, directly forward the messages to the local management module, and for ordinary service messages, forward the messages to the cascade communications module;

the local management module is configured to: perform local CPU processing on received messages that need to be reported to a network management system or processed by a CPU, for messages that cannot be processed by a CPU because there is no local CPU or the local CPU cannot process, directly output the messages to the backplane area through an encapsulation by the local public management module, as well as receive management information messages from the backplane area;

the local clock module is configured to: process the input clock signal which has passed through the interface unit, support to configure and extract a channel associated clock signal of any two-way interface signals connected with the switch module, and support a direct communication to the backplane area;

the inter-board communication module is configured to: process the received ordinary service messages, complete encapsulation and conversion of the messages in the backplane area, and transmit the data to another low-speed switch daughter card or the high-speed switch daughter card within the local device.

Preferably, in the abovementioned terminal device, the interface unit comprises one or more of the following interface daughter cards:

Ethernet Passive Optical Network (EPON) interface daughter card, Gigabit Passive Optical Network (GPON) interface daughter card, 100 GPON interface daughter card, 100 EPON interface daughter card, orthogonal frequency division multiplexing passive optical network (OFDM-PON) interface daughter card, wavelength division multiplexing passive optical network (WDM-PON) interface daughter card, fast Ethernet (FE) electrical interface daughter card, Gigabit Ethernet (GE) photoelectric interface daughter card, E1 interface daughter card, T1 interface daughter card, STM-1 optical port daughter card, STM-4 optical port daughter card, RS232 serial port daughter card, and BITS interface daughter card.

Preferably, in the abovementioned terminal device, a plurality of low-speed switch daughter cards and high-speed switch daughter cards in the core area are virtualized into one switch daughter card for use.

Preferably, in the abovementioned terminal device, a plurality of high-speed switch daughter cards in the core area are cascaded for use.

The embodiment of the present document further discloses an implementation method of an optical line terminal device, comprising:

an interface unit in the optical line terminal device receiving message data sent by an external device, converting the message data for protocol processing corresponding to a service processing apparatus in the optical line terminal device, converting a signal after the protocol processing into data in an Ethernet format, and transmitting the data to the service processing apparatus;

the service processing apparatus performing service processing on the data transmitted by the interface unit, and transmitting the processed data to the interface unit in the Ethernet format;

the interface unit receiving the data in the Ethernet format transmitted by the service processing apparatus, performing protocol processing on the received data in the Ethernet format, converting the data after the protocol processing into a transmission signal corresponding to a sending interface, and then transmitting the signal to the external device.

Preferably, in the abovementioned method, the service processing apparatus is implemented with an Ethernet switch.

Preferably, in the abovementioned method, the service processing apparatus comprises a core area, a backplane area, a power supply area and a fan area, wherein:

the core area performs service processing on the signal transmitted by the interface unit, transmits the processed signal to the interface unit, and implements data transmission between various services through the backplane area.

Preferably, in the abovementioned method, the core area comprises a pass-through daughter card, a low-speed switch daughter card and a high-speed switch daughter card, wherein:

the pass-through daughter card communicates with each switch daughter card, and the switch daughter card comprises a low-speed switch daughter card and a high-speed switch daughter card;

the high-speed switch daughter card performs a basic communication function between each switch daughter card, and processes information carried in messages sent to an external device;

the low-speed switch daughter card performs encapsulation and conversion on the messages in the backplane area, and implements data exchange between each switch daughter card.

Preferably, in the abovementioned method, the high-speed switch daughter card comprises a public switch module, a public management module, a public clock module and a cascade communication module, wherein:

the public switch module receives an Ethernet signal output from the interface unit, and completes message modifying and forwarding operations of a switch part, and for messages that need to be reported to a network management system or processed by a CPU, forwards the messages to the public management module through an Ethernet interface specified in the interface unit, for messages that cannot be processed by a CPU because there is no local CPU or the local CPU is not able to process the messages, directly forwards the messages to the public management module, and for ordinary service messages, forwards the messages to the cascade communication module;

the public management module performs local CPU processing on received messages that need to be reported to a network management system or processed by a CPU, for messages that cannot be processed by a CPU because there is no local CPU or the local CPU is not able to process the messages, directly outputs the messages to the backplane area through an encapsulation by the local public management module, and as well as receives management information messages from the backplane area;

the public clock module processes an input clock signal which has passed through the interface unit, supports to configure and extract a channel associated clock signal of any two-way interface signals connected with the switch module, and supports a direct communication to the backplane area;

the cascade communication module processes the received ordinary service messages, and determines information to be carried in the messages when being sent to the external device.

Preferably, in the abovementioned method, the low-speed switch daughter card comprises a local switch module, a local management module, a local clock module and an inter-board communication module, wherein:

the local switch module receives an Ethernet signal output by the interface unit and completes message modifying and forwarding operations of a switch part, for messages that need to be reported to a network management system or processed by a CPU, forwards the messages to the local management module through an Ethernet interface specified in the interface unit, for messages that cannot be processed by a CPU because there is no local CPU or the local CPU is not able to process the messages, directly forwards the messages to the local management module, and for ordinary service messages, forwards the messages to the cascade communication module;

the local management module performs local CPU processing on received messages that need to be reported to a network management system or processed by a CPU, for messages that cannot be processed by a CPU because there is no local CPU or the local CPU is not able to process the messages, directly outputs the messages to the backplane area through an encapsulation by the local public management module, and as well as receives management information messages from the backplane area;

the local clock module processes an input clock signal which has passed through the interface unit, supports to configure and extract a channel associated clock signal of any two-way interface signals connected with the switch module, and supports a direct communication to the backplane area;

the inter-board communication module processes received ordinary service messages, completes encapsulation and conversion of the messages in the backplane area, and transmits the data to another low-speed switch daughter card or a high-speed switch daughter card within the local device.

Preferably, in the abovementioned method, a plurality of low-speed switch daughter cards and high-speed switch daughter cards in the core area are virtualized into one switch daughter card for use.

Preferably, in the abovementioned method, a plurality of high-speed switch daughter cards in the core area are cascaded for use.

The technical scheme of the present application provides a grouped core integrated OLT device and implementation method thereof, achieves the component miniaturization and modularization within the OLT device, and lays a foundation for achieving the PON-based triple play.

PREFERRED EMBODIMENTS OF THE INVENTION

Figure 1:
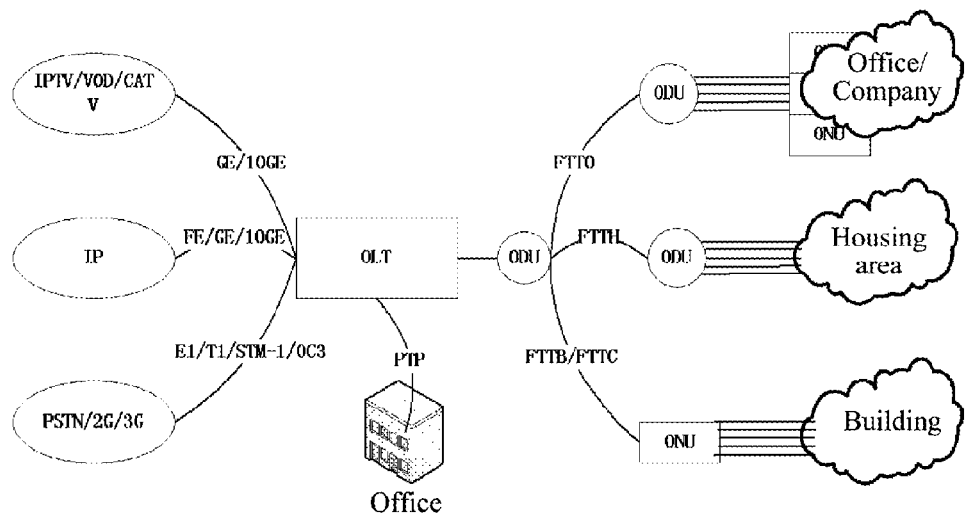
FIG. 1 is a schematic diagram of a typical networking in the PON system.
Figure 2:
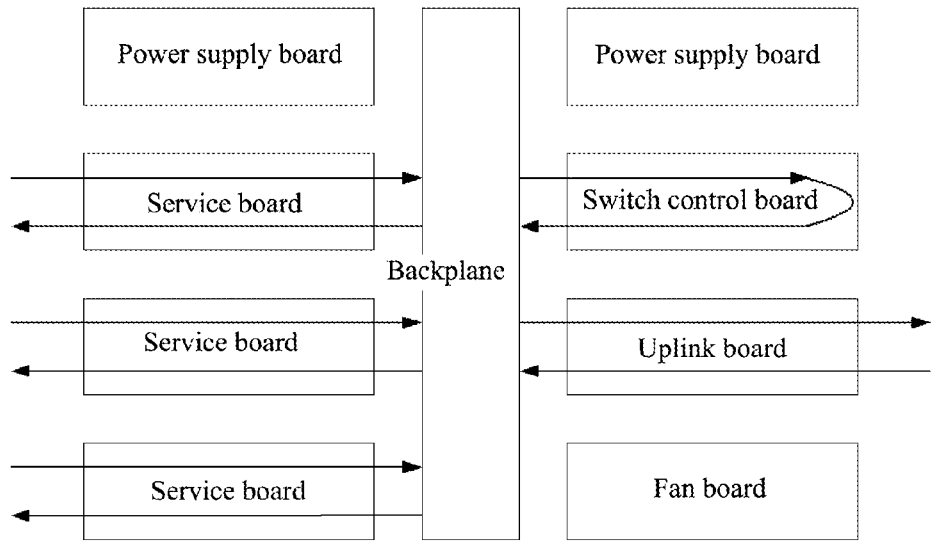
FIG. 2 is a schematic diagram of the structure of an existing OLT device system.

Hereinafter, with combination of the accompanying drawings, the technical scheme of the present document will be further described in detail. It should be noted that, in the case of no conflict, the embodiments and the features in the embodiments of the present application may be arbitrarily combined with each other.

The First Embodiment

The present embodiment provides an optical line terminal device, at least comprising an interface unit and a service processing apparatus.

the interface unit receives data in the Ethernet format transmitted by the service processing apparatus, performs protocol processing on the received data in the Ethernet format, converts the data after protocol processing into a transmission signal corresponding to a sending interface and then transmits the signal to an external device, as well as receives message data transmitted by the external device, converts the message data for protocol processing corresponding to the service processing apparatus, converts the signal after protocol processing into the data in the Ethernet format, and transmits the data to the service processing apparatus;

specifically, the interface unit may comprise one or more of the following daughter cards:

EPON interface daughter card, GPON interface daughter card, 10G GPON interface daughter card, 10G EPON interface daughter card, OFDM-PON interface daughter card, WDM-PON interface daughter card, FE electrical interface daughter card, GE photoelectric interface daughter card, E1 interface daughter card, T1 interface daughter card, STM-1 optical port daughter card, STM-4 optical port daughter card, RS232 serial daughter card, BITS interface daughter card, and so on.

Preferably, each interface daughter card in the interface unit can use the same or equal-proportional encapsulation size, and is connected with the service processing apparatus through a unified interface form. Wherein each interface daughter card using the same or equal-proportional encapsulation size is to facilitate the preparation, production and processing, which makes the replacement and maintenance flexible in the using course. For example, the GE photoelectric interface daughter card is replaced with the STM-1 optical port daughter card, with the physical dimension remaining unchanged, and other daughter card services in the interface area are not affected.

It further needs to be pointed out that, in addition to the abovementioned daughter cards, the interface unit can further comprise one or more interface daughter cards that are developed for the new features under the same principle, and are compatible with the existing interface daughter cards having a variety of interface functions.

The service processing apparatus mainly performs service processing on the signal transmitted by the interface unit and transmits the processed signal to the interface unit. Of course, the service processing apparatus can also process endogenous signals (such as endogenous management message, control signaling, and so on), as well as performs message processing and forwarding on the accessed traffic data, so as to have the hardware foundation of the triple play capability.

Wherein, the specific implementation form of the service processing apparatus is not limited.

For example, it may be implemented by a standard Ethernet switch, while all kinds of interface daughter cards in the interface unit support direct plug-in plug-out on a standard Ethernet switch interface.

Figure 3:
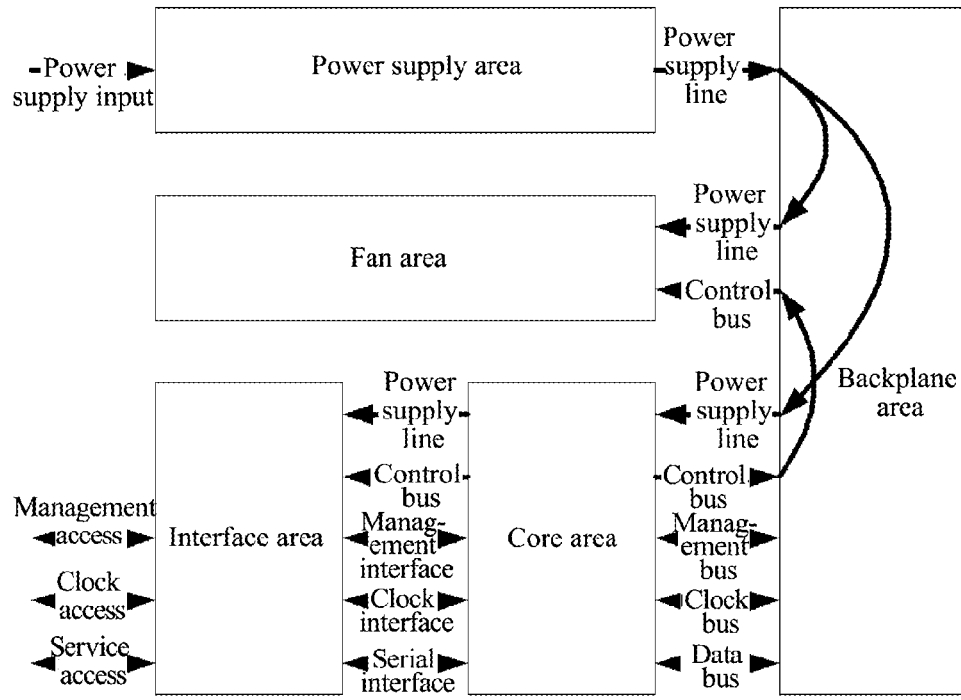
FIG. 3 is a schematic diagram of the structure of an OLT device provided in the present embodiment.

In addition, the service processing apparatus may be further divided, that is, the service processing apparatus consists of at least a core area, a backplane area, a power supply area, and a fan area. In this case, the structure of the entire optical line terminal device is shown in FIG. 3. Wherein, the core area performs service processing on the signal transmitted by the interface unit, and transmits the processed signal to the interface unit, and implements the data transmission between the services through the backplane area.

Figure 4:
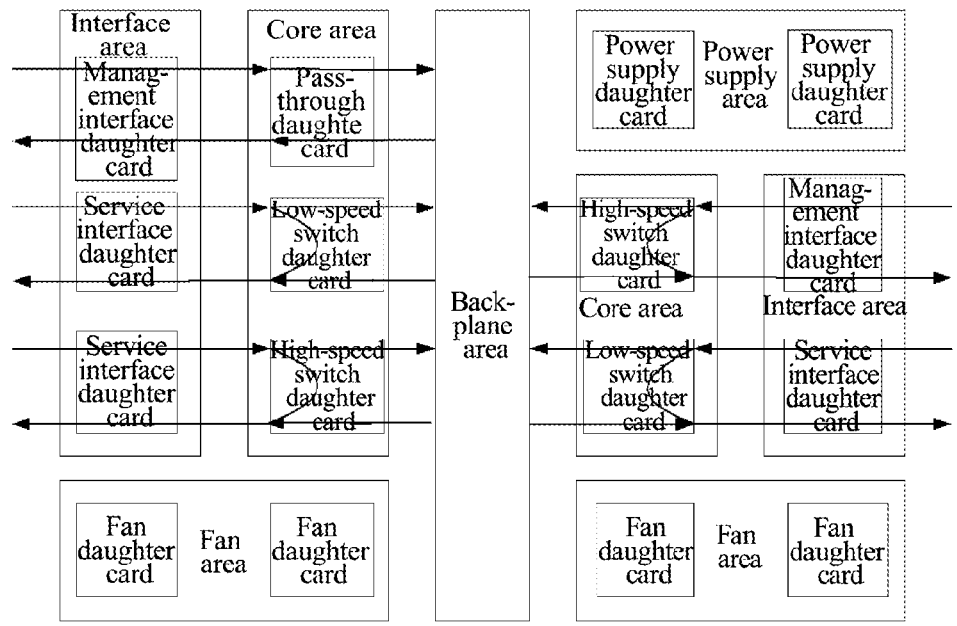
FIG. 4 is a schematic diagram of the implementation structure of an OLT device provided in the present embodiment.

Specifically, the optical line terminal (OLT) device shown in FIG. 3 can also be divided into physical and logical partitions, where miniaturized and modularized components are provided in each partition separately, and the structure of the terminal device is shown in FIG. 4.

The core area comprises modularized core components such as a pass-through daughter card, a low-speed switch daughter card and a high-speed switch daughter card, and each core component completes the connection from the interface area to the backplane area.

the pass-through daughter card mainly communicates with each switch daughter card, so as to implement the data transmission with other daughter cards within the local device;

the high-speed switch daughter card is configured to perform the basic communication functions between the switch daughter cards and process the information carried in the messages when sent to the external device;

the low-speed switch daughter card is configured to perform the encapsulation and conversion of the messages in the backplane area, so as to implement the data exchange between the switch daughter cards.

Preferably, the abovementioned multiple low-speed/high-speed switch daughter cards can be virtualized into one switch daughter card for use. Therefore, after the device starts the virtualization, it virtualizes the service originally separated in multiple switch daughter cards into one switch daughter card for implementation, and the processing and forwarding process is the same as the local network, which can greatly simplify the process. After the device starts the virtualization, the hardware resources can be shared between different switch daughter cards, therefore one switch daughter card can take advantage of the remaining switching capacity of other switch daughter cards to forward services, so as to improve the resource utilization. After the device starts the virtualization, the traffic flow can also be shared between different switch daughter cards, so as to prevent all services on one switch daughter card that fails from being interrupted, thus reducing the risk of device failure. In addition, multiple high-speed switch daughter cards can be cascaded to form into a device with a larger capacity.

In the following, the abovementioned terminal device will be described in detail with reference to the actual services in the passive optical network (PON).

Figure 5:
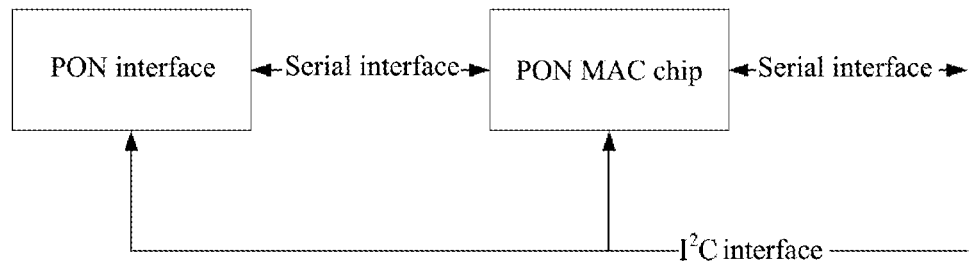
FIG. 5 is a schematic diagram of the interface daughter card structure of an OLT device provided in the present embodiment.

In the terminal device shown in FIG. 4, the principle of the interface unit is shown in FIG. 5. The uplink service implements the conversion from optical signals to electrical signals through the optical module of the service interface daughter card, and then implements the protocol processing of the PON MAC layer through the PON MAC chip, and converts the data into the Ethernet format, and then sends the data out via the Ethernet interface to the service interface daughter card at the output. The service interface daughter card is connected with the low-speed/high-speed switch daughter card, and the communication between the service interface daughter cards within the local network is carried out within the switch daughter card, while the service sent to the extranet is sent through the backplane. Specifically, the local service generally can be completed within one switch daughter card, while the service sent to the extranet is sent to another switch daughter card to continually be processed in another network through the backplane, and then output. When the another switch daughter card is in the same device, the data can be forwarded via the backplane; when the another switch daughter card is not in the same device, the service sent to the extranet is firstly sent to the high-speed switch daughter card within the local device through the backplane, and then sent out by the interface unit. Since the interface daughter card in accordance with the embodiment of the present document uses the standard Ethernet interface, the interface daughter cards of different PON protocols can connect with the switch daughter card, so as to be processed together. The unified interface component supports to connect with different types of PON network devices, which enhances the flexibility of the device. The standardized interface component changes the interface processing of different single boards into the unified daughter card form, which reduces the complexity of the device.

Figure 6:
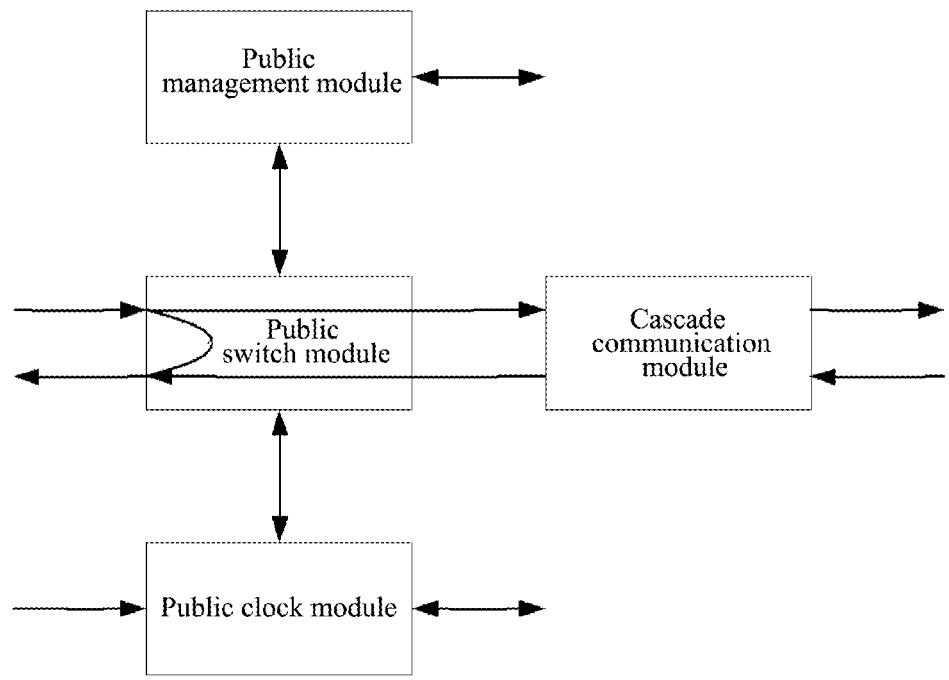
FIG. 6 is a schematic diagram of the switch daughter card structure of an OLT device provided in the present embodiment.

The principle of the high-speed switch daughter card is shown in FIG. 6, comprising a public switch module, a public management module, a public clock module and a cascade communication module. Take the public switch module as the core, it receives the Ethernet signal output by the previous-stage input interface daughter card, and completes the message modifying and forwarding operations of the switch part. The messages that need to be reported to the network management system or processed by the CPU are forwarded to the public management module to perform the local CPU processing through the set Ethernet GMII interface (a certain interface daughter card, such as the FE electrical interface daughter card, specified by the upper layer software), and the messages that do not have local CPU or the local CPU is not able to process the messages can be directly output to the backplane area after the messages are encapsulated by the public management module, meanwhile the public management module can also receive the management information message from the backplane area; the input clock signal is sent to the public clock module of the high-speed switch daughter card to be processed which has passed through the interface daughter card, and the public clock module supports to configure and extract the channel associated clock signal of any two-way interface signals connected with the switch module, the public clock module also supports the direct communication to the backplane area; after the ordinary service messages (that is, any messages other than those that need to be reported to the network management system, need to be processed by the CPU, or cannot be processed because there is no local CPU or the local CPU can not process) are processed by the public switch module, they are continually forwarded to the cascade communication module for processing, while when the cascade communication module processes the received ordinary service messages, it also needs to determine the information that needs to be carried in the messages when sent to the external device.

The low-speed switch daughter card comprises the local switch module, the local management module, the local clock module and the inter-board communication module, which mainly preform the communication and data transmission between the switch daughter cards, and complete the message encapsulation and conversion in the backplane area, as well as transmit the data to another low-speed switch daughter card or the high-speed switch daughter card within the device. The local switch module receives the Ethernet signal output by the interface unit, and completes the message modifying and forwarding operations of the switch part, forwards the messages that need to be reported to the network management system or processed by the CPU to the local management module through the specified Ethernet interface in the interface unit, directly forwards the messages that do not have a local CPU or the local CPU is not able to process the messages to the local management module, and forwards the ordinary service messages to the cascade communication module. The local management module performs local CPU processing on the received messages that need to be reported to the network management system or processed by the CPU, for the messages that do not have a local CPU or the local CPU is not able to process the messages, directly outputs them to the backplane area after the messages are encapsulated by the public management module, and receives the management information message sent from the backplane area. The local clock module processes the input clock signal which has passed through the interface unit, and supports to configure and extract the channel associated clock signal of any two-way interface signals connected with the switch module, and supports the direct communication to the backplane area. The inter-board communication module processes all the received ordinary service messages, completes the message encapsulation and conversion in the backplane area, and transmits the data to another low-speed switch daughter card or the high-speed switch daughter card within the local device.

In addition, the integrated OLT device in accordance with the present embodiment is also designed to provide an independent backplane area, comprising one backplane that supports data exchange, management information transmission and clock signal transmission in the core area; an intelligent power supply area comprises two power supply daughter cards to support the primary and standby power supplies to work at the same time, the primary and standby switches are not perceivable to other partitions; an flexible fan area comprises many different types of fan daughter cards, which are used to provide different cooling strategies to different partitions.

The Second Embodiment

The present embodiment provides an implementation method of an optical line terminal device, and the method comprising:

an interface unit in the optical line terminal device receiving message data sent by an external device, converting the message data for protocol processing corresponding to a service processing apparatus in the optical line terminal device, and converting a signal after the protocol processing into data in the Ethernet format, and transmitting it to the service processing apparatus;

the service processing apparatus performing service processing on the data transmitted by the interface unit, and transmitting the processed data in the Ethernet format to the interface unit;

the interface unit receiving the data in the Ethernet format transmitted by the service processing apparatus, performing protocol processing on the received data in the Ethernet format, converting the data after protocol processing into the transmission signal corresponding to a sending interface and then transmitting the data to the external device.

Wherein, the service processing apparatus can be implemented with an Ethernet switch.

The abovementioned service processing apparatus can also be implemented in other ways, for example, it consists of a core area, a backplane area, a power supply area and a fan area, wherein:

the core area performs service processing on the signal transmitted by the interface unit, transmits the processed signal to the interface unit, and implements the data transmission between the services through the backplane area.

Specifically, the core area further comprises a pass-through daughter card, a low-speed switch daughter card and a high-speed switch daughter card.

the pass-through daughter card communicates with each switch daughter card, and the switch daughter card comprises the low-speed switch daughter card and the high-speed switch daughter card;

the high-speed switch daughter card performs the basic communication functions between the switch daughter cards and processes the information carried in the messages when sent to the external device;

the low-speed switch daughter card performs the message encapsulation and conversion in the backplane area and implements the data exchange between the switch daughter cards.

The high-speed switch daughter card further comprises a public switch module, a public management module, a public clock module and a cascade communication module, wherein:

the public switch module receives the Ethernet signal output by the interface unit, and completes the message modifying and forwarding operations of the switch part, for the messages that need to be reported to the network management system or processed by the CPU, forwards them to the public management module through the specified Ethernet interface in the interface unit, for the messages that do not have a local CPU or the local CPU is not able to process the messages, forward them directly to the public management module, for the ordinary service messages, forward them to the cascade communication module;

the public management module performs local CPU processing on the received messages that need to be reported to the network management system or processed by the CPU, for the messages that can not be processed by the CPU because there is no local CPU or the local CPU is not able to process the messages, directly outputs them to the backplane area after the messages are encapsulated by the local public management module, as well as receives the management information messages sent from the backplane area;

the public clock module processes the input clock signal passed through the interface unit, supports to configure and extract the channel associated clock signal of any two-way interface signals connected with the switch module, and supports the direct communication to the backplane area;

the cascade communication module processes the received ordinary service messages, and determines the information to be carried in the messages when sent to an external device.

the low-speed switch daughter card comprises a local switch module, a local management module, a local clock module and an inter-board communication module.

The local switch module receives the Ethernet signal output by the interface unit, and completes the message modifying and forwarding operations of the switch part, for the messages that need to be reported to the network management system or processed by the CPU, forwards them to the local network management module through the Ethernet interface specified in the interface unit, for the messages that do not have a local CPU or the local CPU is not able to process the messages, directly forwards them to the local management module, for the ordinary service messages, forwards them to the cascade communication module;

the local management module performs local CPU processing on the received messages that need to be reported to the network management system or processed by the CPU, for the messages that do not have a local CPU or the local CPU is not able to process the messages, directly outputs them to the backplane area after the messages are encapsulated by the local public management module, as well as receives the management information message from the backplane area;

the local clock module processes the input clock signal passed through the interface unit, supports the configuration and extraction of the channel associated clock signal of any two-way interface signals connected with the switch module, and supports the direct communication to the backplane area;

the inter-board communication module processes the received ordinary service messages, completes the encapsulation and conversion of messages in the backplane area, and transmits the data to another low-speed switch daughter card or a high-speed switch daughter card within the local device.

In practical applications, a plurality of low-speed switch daughter cards and high-speed switch daughter cards in the above core area are virtualized into one switch daughter card for use. And a plurality of high-speed switch daughter cards in the core area is cascaded for use to form a device with a higher capacity for use.

A person of ordinary skill in the art can understand that all or some of the steps in the abovementioned method can be implemented by a program instructing the related hardware tool, and the program may be stored in a computer readable storage medium, such as a read-only memory, a magnetic or optical disk. Alternatively, all or some of the steps in the abovementioned embodiment can also be implemented with one or more integrated circuits. Accordingly, each module/unit in the abovementioned embodiment may be implemented in the form of hardware or software functional modules. The present application is not limited to any particular form of a combination of hardware and software.

It can be seen from the abovementioned embodiments that, compared with the prior art, the technical scheme of the present application has the following evident, prominent and substantive features and significant advantages:

A) the OLT device provided in the present application has standardized interface components, processes and changes the interfaces of different kinds of single boards into a unified daughter card form, so as to support the direct plug-in plug-out on the standard Ethernet switch interface, which greatly reduces the complexity of the device.

B) the OLT device provided in the present application further has modularized interface components, it can configure the interfaces according to the actual needs, support connection with more different types of network devices, and enhance the flexibility of the device.

C) the OLT device provided in the present application has miniaturized interface components, it can provide interface components that have more than twice of the maximum number of interfaces that the existing device has, support multiple user access, and improve the integration level of the device.

D) the OLT device provided in the present application has virtualized switch components, it can virtualize a plurality of switch daughter cards into one switch daughter card to use, balance the load between the switch daughter cards, and dramatically increase the resource utilization.

E) the OLT device provided in the present application has distributed switch components, and a single switch daughter card can independently forward more than 80% of the local traffic, and allow the device to provide larger access bandwidth.

F) the OLT device provided in the present application has grouped switch components, and through the data forwarding based on the traffic flow control, it can smoothly transit to the next-generation network, thus effectively reducing the device operation cost.

G) the OLT device provided in the present application has modularized switch components, and through the form of cascading the switch components within the device and between the devices, the existing switching components are integrated, greatly shortening the preparation time of network upgrade and expansion.

INDUSTRIAL APPLICABILITY

The embodiment of the present application provides a grouped core integrated OLT device and implementation method thereof, achieves the component miniaturization and modularization within the OLT device, and lays a foundation for achieving the PON-based triple play.

What is claimed is:

1. An optical line terminal (OLT) device, comprising a hardware interface and a service processing apparatus, wherein:
   the hardware interface is configured to: receive data in an Ethernet format transmitted by the service processing apparatus, perform protocol processing on the received data in the Ethernet format, convert the data after protocol processing into a transmission signal corresponding to a sending interface and then transmit the transmission signal to an external device, as well as receive message data sent by the external device, and convert the message data for protocol processing corresponding to the service processing apparatus, and convert a signal after the protocol processing into data in the Ethernet format, and transmit the data to the service processing apparatus;
   the service processing apparatus is configured to: perform service processing on the data transmitted by the hardware interface, and transmit the processed data to the hardware interface;
   wherein the service processing apparatus comprises a core area, a backplane area, a power supply area, and a fan area, wherein:
      the core area is configured to: perform service processing on the signal transmitted by the hardware interface, and transmit the processed signal to the hardware interface, as well as implement data transmission between various services through the backplane area;
   wherein a plurality of low-speed switch daughter cards and high-speed switch daughter cards in the core area are virtualized into one switch daughter card for use, or a plurality of high-speed switch daughter cards in the core area are cascaded for use.

2. The terminal device of claim 1, wherein, the service processing apparatus is implemented with an Ethernet switch.

3. The terminal device of claim 1, wherein, the core area comprises a pass-through daughter card, a low-speed switch daughter card and a high-speed switch daughter card, wherein:
   the pass-through daughter card is configured to: communicate with each switch daughter card, and the switch daughter card comprises a low-speed switch daughter card and a high-speed switch daughter card;
   the high-speed switch daughter card is configured to: perform a basic communication function between each switch daughter card, and process information carried in messages sent to the external device;
   the low-speed switch daughter card is configured to: perform an encapsulation and conversion on the messages in the backplane area, and implement data exchange between each switch daughter card.

4. The terminal device of claim 3, wherein, the high-speed switching daughter card comprises a public switch module, a public management module, a public clock module and a cascade communication module, wherein:
   the public switch module is configured to: receive an Ethernet signal output by the hardware interface, complete message modifying and forwarding operations of a switch part, and for messages that need to be reported to a network management system or processed by a CPU, forward the messages to the public management module through an Ethernet interface specified in the hardware interface, while for messages that cannot be processed by a CPU because there is no local CPU or the local CPU is not able to process the messages, directly forward the messages to the public management module, and for ordinary service messages, forward the messages to the cascade communications module;
   the public management module is configured to: perform local CPU processing on the received messages that need to be reported to a network management system or processed by a CPU, for messages that cannot be processed by a CPU because there is no local CPU or the local CPU is not able to process the messages, directly output the messages to the backplane area through an encapsulation by the local public management module, as well as receive a management information message from the backplane area;
   the public clock module is configured to: process an input clock signal which has passed through the hardware interface, support to configure and extract a channel associated clock signal of any two-way interface signals connected with the switch module, and support a direct communication to the backplane area;
   the cascade communication module is configured to: process received ordinary service messages, and determine the information to be carried in the message when being sent to an external device.

5. The terminal device of claim 3, wherein, the low-speed switch daughter card comprises a local switch module, a local management module, a local clock module and an inter-board communication module, wherein:
   the local switch module is configured to: receive an Ethernet signal output from the hardware interface, complete message modifying and forwarding operations of a switch part, for messages that need to be reported to a network management system or processed by a CPU, forward the messages to the local management module through an Ethernet interface specified in the hardware interface, for messages that cannot be processed by a CPU because there is no local CPU or the local CPU is not able to process the messages, directly forward the messages to the local management module, and for ordinary service messages, forward the messages to the cascade communications module;
   the local management module is configured to: perform local CPU processing on received messages that need to be reported to a network management system or processed by a CPU, for messages that cannot be processed by a CPU because there is no local CPU or the local CPU cannot process, directly output the messages to the backplane area through an encapsulation by the local public management module, as well as receive management information messages from the backplane area;

the local clock module is configured to: process an input clock signal which has passed through the hardware interface, support to configure and extract a channel associated clock signal of any two-way interface signals connected with the switch module, and support a direct communication to the backplane area;

the inter-board communication module is configured to: process received ordinary service messages, complete encapsulation and conversion of the messages in the backplane area, and transmit data to another low-speed switch daughter card or the high-speed switch daughter card within the local device.

6. The terminal device of claim 1, wherein, the hardware interface comprises one or more of the following interface daughter cards:

Ethernet Passive Optical Network (EPON) interface daughter card, Gigabit Passive Optical Network (GPON) interface daughter card, 10G GPON interface daughter card, 10G EPON interface daughter card, orthogonal frequency division multiplexing passive optical network (OFDM-PON) interface daughter card, wavelength division multiplexing passive optical network (WDM-PON) interface daughter card, fast Ethernet (FE) electrical interface daughter card, Gigabit Ethernet (GE) photoelectric interface daughter card, E1 interface daughter card, T1 interface daughter card, STM-1 optical port daughter card, STM-4 optical port daughter card, RS232 serial port daughter card, and BITS interface daughter card.

7. An implementation method of an optical line terminal device, comprising:

receiving, by a hardware interface in the optical line terminal device, message data sent by an external device, converting the message data for protocol processing corresponding to a service processing apparatus in the optical line terminal device, converting a signal after the protocol processing into data in an Ethernet format, and transmitting the data to the service processing apparatus;

performing, by the service processing apparatus, service processing on the data transmitted by the hardware interface, and transmitting the processed data to the hardware interface in the Ethernet format;

receiving, by the hardware interface, the data in the Ethernet format transmitted by the service processing apparatus, performing protocol processing on the received data in the Ethernet format, converting the data after the protocol processing into a transmission signal corresponding to a sending interface, and then transmitting the signal to the external device;

wherein the service processing apparatus comprises a core area, a backplane area, a power supply area and a fan area, and method further comprising:

performing, by the core area, service processing on the signal transmitted by the hardware interface, transmitting the processed signal to the hardware interface, and implementing data transmission between various services through the backplane area;

wherein a plurality of low-speed switch daughter cards and high-speed switch daughter cards in the core area are virtualized into one switch daughter card for use, or a plurality of high-speed switch daughter cards in the core area are cascaded for use.

8. The method of claim 7, wherein, the service processing apparatus is implemented with an Ethernet switch.

9. The method of claim 7, wherein, the core area comprises a pass-through daughter card, a low-speed switch daughter card and a high-speed switch daughter card, wherein:

the pass-through daughter card communicates with each switch daughter card, and the switch daughter card comprises a low-speed switch daughter card and a high-speed switch daughter card;

the high-speed switch daughter card performs a basic communication function between each switch daughter card, and processes information carried in messages sent to an external device;

the low-speed switch daughter card performs encapsulation and conversion on the messages in the backplane area, and implements data exchange between each switch daughter card.

10. The method of claim 9, wherein, the high-speed switch daughter card comprises a public switch module, a public management module, a public clock module and a cascade communication module, wherein:

the public switch module receives an Ethernet signal output from the hardware interface, and completes message modifying and forwarding operations of a switch part, and for messages that need to be reported to a network management system or processed by a CPU, forwards the messages to the public management module through an Ethernet interface specified in the hardware interface, for messages that cannot be processed by a CPU because there is no local CPU or the local CPU is not able to process the messages, directly forwards the messages to the public management module, and for ordinary service messages, forwards the messages to the cascade communication module;

the public management module performs local CPU processing on received messages that need to be reported to a network management system or processed by a CPU, for messages that cannot be processed by a CPU because there is no local CPU or the local CPU is not able to process the messages, directly outputs the messages to the backplane area through an encapsulation by the local public management module, and as well as receives management information messages from the backplane area;

the public clock module processes an input clock signal which has passed through the hardware interface, supports to configure and extract a channel associated clock signal of any two-way interface signals connected with the switch module, and supports a direct communication to the backplane area;

the cascade communication module processes received ordinary service messages, and determines information to be carried in the messages when being sent to the external device.

11. The method of claim 9, wherein, the low-speed switch daughter card comprises a local switch module, a local management module, a local clock module and an inter-board communication module, wherein:

the local switch module receives an Ethernet signal output by the hardware interface and completes message modifying and forwarding operations of a switch part, for messages that need to be reported to a network management system or processed by a CPU, forwards the messages to the local management module through an Ethernet interface specified in the hardware interface, for messages that cannot be processed by a CPU because there is no local CPU or the local CPU is not able to process the messages, directly forwards the messages to the local management module, and for ordinary service messages, forwards the messages to the cascade communication module;

the local management module performs local CPU processing on received messages that need to be reported to a network management system or processed by a CPU, for messages that cannot be processed by a CPU because there is no local CPU or the local CPU is not able to process the messages, directly outputs the messages to the backplane area through an encapsulation by the local public management module, and as well as receives management information messages from the backplane area;

the local clock module processes an input clock signal which has passed through the hardware interface, supports to configure and extract a channel associated clock signal of any two-way interface signals connected with the switch module, and supports a direct communication to the backplane area;

the inter-board communication module processes received ordinary service messages, completes encapsulation and conversion of the messages in the backplane area, and transmits data to another low-speed switch daughter card or a high-speed switch daughter card within the local device.

* * * * *